(12) United States Patent
Jiang et al.

(10) Patent No.: US 10,525,450 B2
(45) Date of Patent: Jan. 7, 2020

(54) CO SHIFT CATALYST CARRIER, CATALYST BASED ON THE CATALYST CARRIER AND PREPARATION PROCESS THEREOF

(71) Applicant: FUZHOU UNIVERSITY NATIONAL ENGINEERING RESEARCH CENTER OF CHEMICAL FERTILIZER CATALYST, Fuzhou, Fujian (CN)

(72) Inventors: Lilong Jiang, Fuzhou (CN); Yanning Cao, Fuzhou (CN)

(73) Assignee: FUZHOU UNIVERSITY NATIONAL ENGINEERING CENTER OF CHEMICAL FERTILIZER CATALYST, Fujian (CN)

( * ) Notice: Subject to any disclaimer, the term of this patent is extended or adjusted under 35 U.S.C. 154(b) by 0 days.

(21) Appl. No.: 15/303,651

(22) PCT Filed: Nov. 12, 2015

(86) PCT No.: PCT/CN2015/094408
§ 371 (c)(1),
(2) Date: Oct. 12, 2016

(87) PCT Pub. No.: WO2017/008419
PCT Pub. Date: Jan. 19, 2017

(65) Prior Publication Data
US 2018/0117569 A1    May 3, 2018

(30) Foreign Application Priority Data
Jul. 13, 2015    (CN) .......................... 2015 1 0407984

(51) Int. Cl.
*B01J 23/888*    (2006.01)
*B01J 37/04*    (2006.01)
(Continued)

(52) U.S. Cl.
CPC ........... *B01J 23/8885* (2013.01); *B01J 21/16* (2013.01); *B01J 23/02* (2013.01); *B01J 23/882* (2013.01);
(Continued)

(58) Field of Classification Search
CPC ........ B01J 23/02; B01J 23/882; B01J 23/883; B01J 23/888; B01J 35/006; B01J 35/002;
(Continued)

(56) References Cited

U.S. PATENT DOCUMENTS 7,651,972 B2    1/2010   Yu et al.

FOREIGN PATENT DOCUMENTS

| CN | 102198401 | 9/2011 |
| CN | 102240556 | 11/2011 |
| CN | 105032497 | 11/2015 |

OTHER PUBLICATIONS

CN 102240556A Machine Translation (Year: 2011).*
PCT Search Report dated Apr. 19, 2016 for corresponding PCT International Application No. PCT/CN2015/094408, 5 pages.

* cited by examiner

*Primary Examiner* — James A Fiorito
(74) *Attorney, Agent, or Firm* — Lee & Hayes, P.C.

(57) ABSTRACT

The present invention provides a catalyst carrier with shift and adsorption purification performance, comprising modified bauxite in the raw material components which fluxing and pore forming effects. Most iron oxide contained in the bauxite is removed after modification, so that there are a large amount of highly active aluminosilicate compounds in the modified bauxite. When preparing the catalyst, the aluminosilicate compound serves as a low melting point flux and can significantly increase the migration rate of magnesium and aluminum ions during the calcinating process and promote the generation of $MgAl_2O_4$ at low temperatures, thereby the catalyst carrier of the present invention has strong anti-hydration capacity and mechanical strength. In addition, when the modified bauxite is used as macroporous hard template for the preparation of the catalyst, macro pores can be formed in the structure of the catalyst carrier after (Continued)

calcinating treatment, so that the catalyst carrier of the present invention has strong adsorption purification ability on macromolecular particles including oil pollution and dust.

8 Claims, 1 Drawing Sheet

(51) Int. Cl.
| | |
|---|---|
| *B01J 23/882* | (2006.01) |
| *B01J 23/883* | (2006.01) |
| *C01B 3/16* | (2006.01) |
| *B01J 21/16* | (2006.01) |
| *B01J 23/02* | (2006.01) |
| *B01J 35/00* | (2006.01) |
| *B01J 35/02* | (2006.01) |
| *B01J 35/10* | (2006.01) |
| *B01J 37/00* | (2006.01) |
| *B01J 37/06* | (2006.01) |
| *B01J 37/08* | (2006.01) |
| *B01J 37/02* | (2006.01) |

(52) U.S. Cl.
CPC ........... *B01J 23/883* (2013.01); *B01J 23/888* (2013.01); *B01J 35/002* (2013.01); *B01J 35/0006* (2013.01); *B01J 35/026* (2013.01); *B01J 35/108* (2013.01); *B01J 35/1019* (2013.01); *B01J 35/1038* (2013.01); *B01J 35/1066* (2013.01); *B01J 37/0009* (2013.01); *B01J 37/009* (2013.01); *B01J 37/0207* (2013.01); *B01J 37/04* (2013.01); *B01J 37/06* (2013.01); *B01J 37/08* (2013.01); *B01J 37/088* (2013.01); *C01B 3/16* (2013.01); *C01B 2203/0283* (2013.01); *C01B 2203/1052* (2013.01); *C01B 2203/1058* (2013.01); *C01B 2203/1082* (2013.01)

(58) Field of Classification Search
CPC .. B01J 35/026; B01J 35/1019; B01J 35/1038; B01J 35/1066; B01J 35/108; B01J 37/0009; B01J 37/009; B01J 37/0207; B01J 37/04; B01J 37/06; B01J 37/08; B01J 37/088; C01B 3/16
See application file for complete search history.

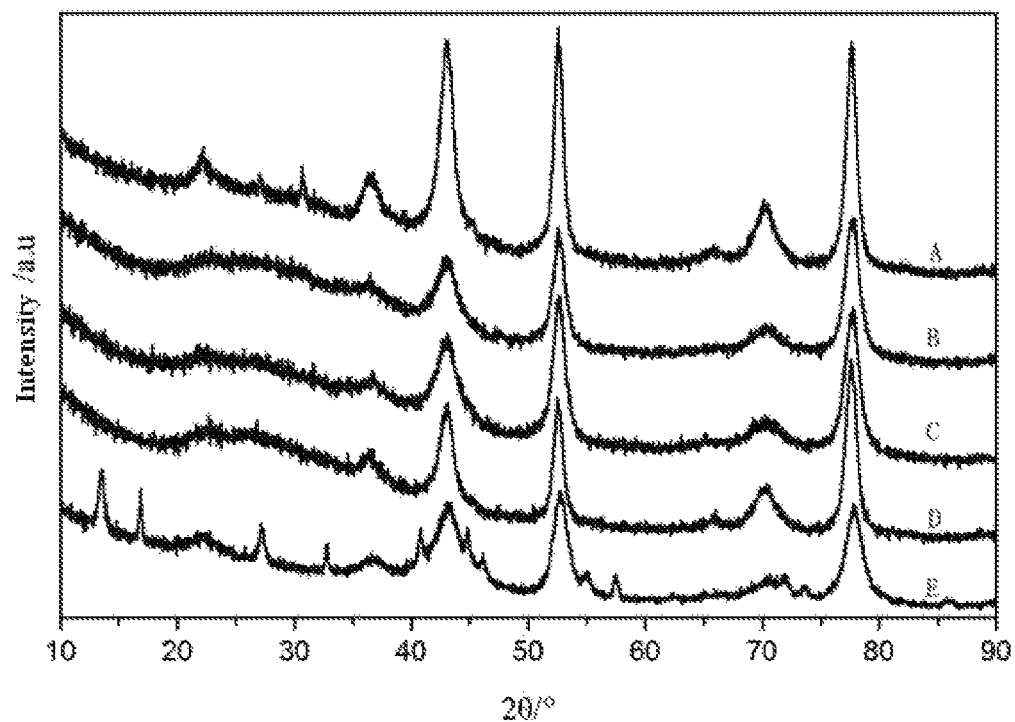

CO SHIFT CATALYST CARRIER, CATALYST BASED ON THE CATALYST CARRIER AND PREPARATION PROCESS THEREOF

CROSS REFERENCE TO RELATED PATENT APPLICATION

This application is a national phase application of International Application No. PCT/CN2015/094408, filed on Nov. 12, 2015, entitled "CO Shift Catalyst Carrier, Catalyst Based on the Catalyst Carrier and Preparation Process Thereof", which claims the benefit of priority of Chinese Patent Application No. 201510407984.X filed on Jul. 13, 2015, which applications are hereby incorporated by reference in their entirety.

FIELD OF THE INVENTION

The present invention relates to a CO shift catalyst carrier, a catalyst based on the catalyst carrier and a preparation process thereof, and particularly relates to a catalyst carrier with shift and adsorption purification performance and a preparation process thereof, belonging to the technical field of catalyst preparation.

DESCRIPTION OF THE RELATED ART

Carbon Monoxide Shift refers to a process that reacting CO containing feed gas with water vapor to form $CO_2$ and $H_2$ in the presence of a catalyst. Currently, in a feed gas prepared by Pressured Gasification of Coal-water Slurry, Pressurized Gasification of Pulverized Coal and Gasification of High-Sulfur Petroleum Coke, the volume concentration of CO reaches 40-65%, the volume ratio of water vapor to dry feed gas, ie., the steam gas ratio, reaches 1.0-1.8, the pressure reaches 3.0-8.0 MPa, $H_2S$ concentration reaches 5-15 $g/Nm^3$, and the feed gas also contains macromolecules poisons and particulate matter including oil pollution and dust therein. In the prior art, to achieve the shift of the feed gas to hydrogen, it is required to use sulfur-tolerant shift process, ie., the prepared feed gas after gasification is direct to shift without desulfurization, and a key factor of the process is the use of CO sulfur-tolerant shift catalyst.

China Patent Application Document CN102240556A disclosed a CO sulfur-tolerant shift catalyst for high pressure process, which comprised a carrier and active ingredients of the catalyst, wherein the carrier comprises a modified bauxite powder in an amount of 5-40 wt % of the carrier, pseudo-boehmite or aluminum nitrate in an amount of 20-60 wt % of the carrier, and magnesium oxide or magnesium hydroxide in an amount of 10-40 wt % of the carrier, and the active ingredients of the catalyst comprises CoO in an amount of 0.5-5 wt % of the catalyst, $MoO_3$ in an amount of 1.0-15 wt % of the catalyst and $CeO_2$ in an amount of 0.3-2 wt % of the catalyst. The CO sulfur-tolerant shift catalyst was prepared by a method comprising the following process: (1) mixing modified bauxite powder, pseudo-boehmite or aluminum nitrate with $CeO_2$ precursor according to the above ratio, and then kneading with the magnesium oxide or magnesium hydroxide to form a first mixture; (2) adding a peptizing agent, a binder, a pore-forming agent and an extrusion assistant to the first mixture for kneading to obtain a second mixture; (3) Drying, extruding and calcining the second mixture obtained to obtain a catalyst carrier; (4) impregnating the catalyst carrier with the active ingredients CoO and $MoO_3$ of the catalyst proportionally, drying and calcining to obtain a finished catalyst. However, the catalytic activity of the finished CO sulfur-tolerant shift catalyst is too high, so that CO conversion rate can reach 91.58% under reaction conditions of 260° C., a steam gas ratio of 1.0 and a gas space velocity of 1000 h-1. Considering the hydrogen producing reaction by CO shift itself is a highly exothermic reaction, therefore, so if the above CO sulfur-tolerant shift catalyst is used for producing hydrogen by shift of a feed gas which has high-concentration CO and high steam gas ratio, the reaction temperature could reach more than 600° C., which will cause sintering of the catalyst and result in catalyst deactivation, even lead to "runaway" phenomenon of the catalyst bed, thereby posing a serious threat to people, equipments and catalysts.

SUMMARY OF THE INVENTION

In order to solve the problems that the CO sulfur-resistant shift catalyst of prior art has too high catalytic activity and thus cannot be applied to produce hydrogen by shift reaction of a feed gas which has high-concentration CO and high steam gas ratio, the present invention provides a catalyst carrier with shift and adsorption purification performance which can be applied to feed gas having high CO concentration, high steam gas ratio and high-pressure, and also provides a catalyst based on the catalyst carrier and a preparation process thereof.

According to one aspect, the present invention provides a catalyst carrier with shift and adsorption purification performance, comprising the following components:
modified bauxite, 5-15 parts by weight;
alumina or pseudo-boehmite, 40-60 parts by weight; and
magnesium oxide or magnesium hydroxide, 20-40 parts by weight;
wherein,
the modified bauxite is prepared by steps of:
subjecting a natural bauxite to an acid treatment to obtain a treated bauxite, then washing the treated bauxite with distilled water until a waste washing solution is neutral, followed by filtering and drying to obtain the modified bauxite.

In accordance with one embodiment, the acid is selected from the group consisting of nitric acid, phosphoric acid, oxalic acid, boric acid or mixtures thereof. The acid has a concentration of 1-3 mol/L, and the acid treatment is carried out at a temperature of 30-70 ⍰ for a period of 2-8 hours.

In accordance with one embodiment, the drying is carried out at a temperature of 120-150° C. for a period of 4-6 hours.

In accordance with one embodiment, the cobalt source is cobalt oxalate, the nickel source is nickel oxalate; the molybdenum source is molybdenum trioxide and/or molybdenum concentrate, and the tungsten source is tungsten trioxide.

In accordance with one embodiment, the modified bauxite has a particle size of 100-150 mesh, a specific surface area of 120-180 $m^2/g$, and a pore volume of 0.15-0.40 ml/g.

In accordance with one embodiment, the catalyst carrier comprises macropore in its structure, and the macropore has a diameter of 100-300 nm and accounts for 10-30% of the catalyst carrier by volume.

According to another aspect, the present invention provides a catalyst based on the catalyst carrier, wherein, the catalyst carrier is loaded with an active ingredient comprising
CoO and/or NiO in 2-5 parts by weight, and
$MoO_3$ and/or $WO_3$ in 6-10 parts by weight.

According to a further aspect, the present invention provides a process for preparing the catalyst, comprising the steps of:

(1) Weighing the modified bauxite, alumina or pseudo-boehmite and magnesium oxide or magnesium hydroxide according to the above-mentioned parts by weight, then fully kneading them with cobalt source and/or nickel source, molybdenum source and/or tungsten source to obtain a mixture;

(2) Extruding the mixture to obtain an extruded product;

(3) Drying and calcining the extruded product to obtain a catalyst that has shift and adsorption purification performance.

In accordance with one embodiment, the cobalt source is cobalt oxalate, the nickel source is nickel oxalate; the molybdenum source is molybdenum trioxide and/or molybdenum concentrate, the tungsten source is tungsten trioxide.

In accordance with one embodiment, in step (3), the drying is carried out at a temperature of 110-140▫ for a period of 4-8 hours; and the calcining is carried out at a temperature of 580-680° C. for a period of 4-8 hours.

According to a further aspect, the present invention provides an application of the catalyst in carbon monoxide sulfur-tolerant shift reaction.

The above technical solutions of the present invention have the following advantages over the prior art:

(1) The catalyst carrier with shift and adsorption purification performance of the present invention uses a modified bauxite, alumina or pseudo-boehmite and magnesium oxide or magnesium hydroxide as raw material components which are mixed in a reasonable proportion. The inventors of the present invention carried out a lot of creative work and surprisingly found that the modified bauxite has fluxing and pore forming effects when it is added into the raw material components. Most iron oxide contained in the bauxite is removed after modification by the method of the present invention, so that there are a large amount of highly active aluminosilicate compounds in the modified bauxite. When preparing the catalyst, the aluminosilicate compound serves as a low melting point flux and can significantly increase the migration rate of magnesium and aluminum ions during the calcinating process, thus promote the generation of $MgAl_2O_4$ phase at low temperatures and simultaneously eliminate the generation of MgO and $Al_2O_3$ which are easy to incur hydration reaction. Ions inside the generated $MgAl_2O_4$ phase are connected with each other via strong ionic bond, thereby the catalyst carrier of the present invention has strong anti-hydration capacity and mechanical strength, so the catalyst carrier is difficult to be pulverized, and can tolerate an impact of high-concentration water vapor, therefore can effectively avoid pulverizing or caking problems when the catalyst is used for feed gas having high-moisture ratio and high-concentration CO.

Mean while, after modified by the process of the invention, the specific surface area of the modified bauxite reaches 233 $m^2/g$, and the pore volume of the modified bauxite reaches 0.46 ml/g. When preparing the catalyst, the bauxite is used as macroporous hard template to form macro pores in the catalyst carrier structure after calcinating treatment, so that the catalyst carrier of the present invention has strong adsorption purification ability on macromolecular particles including oil pollution and dust. In conclusion, the catalyst carrier of the present invention has strong anti-hydration ability and can avoid catalyst desactivation or pulverizing due to hydration reaction caused by condensate water under high steam gas ratio and high pressure. Mean while, the catalyst carrier has macroporous structure, thus can significantly improve the adsorption purification ability on macromolecular particles including oil pollution and dust, and can be applied to a hydrogen producing shift reaction of feed gas having high CO concentration, high steam gas ratio and high pressure.

(2) The catalyst carrier with shift and adsorption purification performance of the present invention comprises active ingredients comprising the following components in part by weight: 2-5 parts of CoO and/or NiO, 6-10 parts of $MoO_3$ and/or $WO_3$, so that the catalyst of the present invention has moderate catalytic activity for CO shift reaction. When it is applied to a hydrogen producing shift reaction of feed gas having high CO concentration, high steam gas ratio and high pressure, it is achieved to firstly shift a partial CO in the feed gas, realizing controllable release of reaction heat, and effectively reducing the CO concentration of subsequent shift reaction and further controlling the release of subsequent reaction heat, so that the catalyst of the invention can achieve the shift of CO in the feed gas in a controllable step manner, and then can control the temperature of the catalyst bed within a reasonable range, and thus effectively avoid the problems that CO sulfur-tolerant shift catalyst of prior art will be easily subjected to deactivation due to high temperature sintering and even lead to "runaway" phenomenon of the catalyst bed when it is applied to a hydrogen producing shift reaction of feed gas having high CO concentration and high steam gas ratio. Therefore, the catalyst of the present invention have a moderate catalytic activity and a suitable CO conversion rate, can effectively avoid the "runaway" phenomenon of the catalyst bed caused by too high catalytic activity, and thus can be applied to a hydrogen producing shift reaction of feed gas having high CO concentration, high steam gas ratio and high pressure.

Furthermore, when the catalyst of the present invention is used in a feed gas having high water stream ratio and high CO concentration, the catalyst has excellent resistance performance to hydration and high strength, so it is difficult to be pulverized and can withstand an impact of high-concentration water vapor. Besides, the macro pores in its structure can absorb and remove large particle impurities including tar and dust in the feed gas.

(3) In the catalyst carrier with shift and adsorption purification performance of the present invention, the cobalt source is cobalt oxalate, the nickel source is oxalate nickel, the molybdenum source is molybdenum trioxide and/or molybdenum concentrate, and the tungsten source is tungsten trioxide, so the catalyst takes full use of the property that cobalt oxalate, nickel oxalate, molybdenum trioxide and/or molybdenum concentrate and tungsten trioxide that are insoluble in water, so that the active ingredients CoO and/or NiO, $MoO_3$ and/or $WO_3$ of the prepared catalyst are suitably dispersed in the support material $MgAl_2O_4$, thus controlling the catalytic conversion performance of the catalyst in a certain range. In addition, the above-mentioned cobalt oxalate, nickel oxalate, molybdenum trioxide and/or molybdenum concentrate and tungsten trioxide, etc., are also beneficial to form macro pores during calcination treatment of the catalyst.

BRIEF DESCRIPTION OF THE DRAWINGS

In order to make the content of the present invention are more likely to be clearly understood, the content of the present invention will now be described in detail with reference to certain Examples and FIGURE, and wherein, FIG. 1 is an XRD pattern of different carriers after the anti-hydration performance test.

DETAILED EMBODIMENTS OF THIS INVENTION 1 part by weight represents, for example, 1 g in the following examples.

Example 1

The example 1 provides a catalyst carrier with shift and adsorption purification performance, the catalyst carrier comprises macropore in its structure, and the macropore has a diameter of 100 nm and accounts for 10% of the catalyst carrier by volume.

The catalyst carrier with shift and adsorption purification performance comprises the following components:
modified bauxite, 8 parts by weight;
alumina, 53 parts by weight;
magnesium oxide, 32 parts by weight;
The modified bauxite is prepared by steps of:
subjecting a natural bauxite to an acid treatment with 1 mol/L of nitric acid at a temperature of 30° C. for a period of 8 hours to obtain a treated bauxite, then washing the treated bauxite with distilled water until a waste washing solution is neutral, followed by filtering and drying at a temperature of 120° C. for a period of 6 hours to obtain the modified bauxite having a particle size of 150 mesh, a specific surface area of 150 $m^2/g$, and a pore volume of 0.25 ml/g.

A catalyst based on the catalyst carrier with shift and adsorption purification performance is further provided. The catalyst carrier is loaded with an active ingredient comprising
NiO in 3.5 parts by weight, and
$MoO_3$ in 8.5 parts by weight.
The catalyst is prepared by steps of:
(1) Weighing the modified bauxite, alumina and magnesium oxide according to the above-mentioned parts by weight, fully kneading with nickel oxalate and molybdenum trioxide to obtain a mixture;
(2) Extruding the mixture to obtain extruded products;
(3) Drying and calcining the extruded product to obtain the catalyst that has shift and adsorption purification performance;
wherein, the drying is carried out at a temperature of 140° C. for a period of 4 hours; the calcining is carried out at a temperature of 680° C. for a period of 4 hours.

Example 2

The example 2 provides a catalyst carrier with shift and adsorption purification performance, the catalyst carrier comprises macropore in its structure, and the macropore has a diameter of 300 nm and accounts for 30% of the catalyst carrier by volume.

The catalyst carrier with shift and adsorption purification performance comprises the following components:
Modified bauxite, 10 parts by weight;
Alumina, 40 parts by weight;
Magnesium oxide, 28 parts by weight;
The modified bauxite is prepared by steps of:
subjecting a natural bauxite to an acid treatment with 3 mol/L of phosphoric acid at a temperature of 70° C. for a period of 2 hours to obtain a treated bauxite, then washing the treated bauxite with distilled water until a waste washing solution is neutral, followed by filtering and drying at a temperature of 150° C. for a period of 4 hours to obtain the modified bauxite having a particle size of 100 mesh, a specific surface area of 120 $m^2/g$, and a pore volume of 0.40 ml/g.

A catalyst based on the catalyst carrier with shift and adsorption purification performance is further provided. The catalyst carrier is loaded with an active ingredient comprising
CoO in 2 parts by weight,
$MoO_3$ in 7 parts by weight, and
$WO_3$ in 3 parts by weight.
The catalyst is prepared by steps of:
(1) Weighing the modified bauxite, alumina and magnesium oxide according to the above-mentioned parts by weight, fully kneading with cobalt oxalate, molybdenum trioxide and tungsten trioxide to obtain a mixture;
(2) Extruding the mixture is to obtain extruded products;
(3) Drying and calcining the extruded product to obtain the catalyst that has shift and adsorption purification performance;
wherein, the drying is carried out at a temperature of 120° C. for a period of 6 hours; the calcining is carried out at a temperature of 600° C. for a period of 5 hours.

Example 3

The example 3 provides a catalyst carrier with shift and adsorption purification performance, the catalyst carrier comprises macropore in its structure, and the macropore has a diameter of 200 nm and accounts for 20% of the catalyst carrier by volume.

The catalyst carrier with shift and adsorption purification performance comprises the following components:
modified bauxite, 15 parts by weight;
pseudo-boehmite, 50 parts by weight;
magnesium hydroxide, 25 parts by weight;
The modified bauxite is prepared by steps of:
subjecting a natural bauxite to an acid treatment with 2 mol/L of oxalic acid at a temperature of 40° C. for a period of 6 hours to obtain a treated bauxite, then washing the treated bauxite with distilled water until a waste washing solution is neutral, followed by filtering and drying at a temperature of 130° C. for a period of 5 hours to obtain the modified bauxite having a particle size of 120 mesh, a specific surface area of 180 $m^2/g$, and a pore volume of 0.15 ml/g.

A catalyst based on the catalyst carrier with shift and adsorption purification performance is further provided. The catalyst carrier is loaded with an active ingredient comprising
CoO in 3 parts by weight,
NiO in 2 parts by weight, and
$MoO_3$ in 6 parts by weight.
The catalyst is prepared by steps of:
(1) Weighing the modified bauxite, pseudo-boehmite and magnesium hydroxide according to the above-mentioned parts by weight, fully kneading with cobalt oxalate, nickel oxalate and molybdenum trioxide to obtain a mixture;
(2) Extruding the mixture to obtain extruded products;
(3) Drying and calcining the extruded product to obtain the catalyst that has shift and adsorption purification performance;
wherein, the drying is carried out at a temperature of 110 ☐ for a period of 8 hours; the calcining is carried out at a temperature of 650° C. for a period of 4 hours.

Example 4

The example 4 provides a catalyst carrier with shift and adsorption purification performance, the catalyst carrier comprises macropore in its structure, and the macropore has a diameter of 250 nm and accounts for 25% of the catalyst carrier by volume.

The catalyst carrier with shift and adsorption purification performance comprising the following components:
modified bauxite, 5 parts by weight;
pseudo-boehmite, 60 parts by weight;
magnesium oxide, 20 parts by weight;
The modified bauxite is prepared by steps of:
subjecting a natural bauxite to an acid treatment with 3 mol/L of boric acid at 60° C. for a period of 6 hours to obtain a treated bauxite, then washing the treated bauxite with distilled water until a waste washing solution is neutral, followed by filtering and drying at a temperature of 130° C. for a period of 5 hours to obtain the modified bauxite having a particle size of 140 mesh, a specific surface area of 161 $m^2/g$, and a pore volume of 0.22 ml/g.

A catalyst based on the catalyst carrier with shift and adsorption purification performance is further provided. The catalyst carrier is loaded with an active ingredient comprising
$CoO$ in 5 parts by weight,
$MoO_3$ in 7 parts by weight, and
$WO_3$ in 3 parts by weight.
The catalyst is prepared by steps of:
(1) Weighing the modified bauxite, pseudo-boehmite and magnesium oxide according to the above-mentioned parts by weight, fully kneading with cobalt oxalate, molybdenum concentrate and tungsten trioxide to obtain a mixture;
(2) Extruding the mixture to obtain extruded products;
(3) Drying and calcining the extruded product to obtain the catalyst that has shift and adsorption purification performance;
wherein, the drying is carried out at a temperature of 120° C. for a period of 6 hours; the calcining is carried out at a temperature of 580° C. for a period of 6 hours.

Comparative Example 1

The comparative example 1 provides a catalyst carrier, comprising the following components:
natural bauxite, 10 parts by weight;
alumina, 40 parts by weight;
magnesium oxide, 28 parts by weight;
A catalyst based on the catalyst carrier with shift and adsorption purification performance is further provided. The catalyst carrier is loaded with an active ingredient comprising
$CoO$ in 2 parts by weight,
$MoO_3$ in 7 parts by weight, and
$WO_3$ in 3 parts by weight.
The catalyst is prepared by steps of:
(1) Weighing the natural bauxite, alumina or magnesium oxide according to the above-mentioned parts by weight, fully kneading with cobalt source cobalt oxalate, molybdenum trioxide and tungsten trioxide to obtain a mixture;
(2) Extruding the mixture to obtain an extruded product;
(3) Drying and calcining the extruded product to obtain the catalyst; wherein, the drying is carried out at a temperature of 120° C. for a period of 6 hours; the calcining is carried out at a temperature of 600° C. for a period of 5 hours.

Comparative Example 2

The comparative example 2 provides a catalyst carrier, comprising the following components:
hydrothermally modified bauxite, 10 parts by weight;
alumina, 40 parts by weight;
magnesium oxide, 28 parts by weight; The hydrothermally modified bauxite is prepared by steps of:
Placing natural bauxite in a high-pressure reactor for hydrothermal treatment at a temperature of 130☐ for a period of 48 hours, filtering, drying at a temperature of 150 ☐ for a period of 4 hours, calcinating at a temperature of 550 ☐ for a period of 4 hours, and cooling to obtain the hydrothermally modified bauxite.

A catalyst based on the catalyst carrier is further provided. The catalyst carrier is loaded with an active ingredient comprising
$CoO$ in 2 parts by weight,
$MoO_3$ in 7 parts by weight, and
$WO_3$ in 3 parts by weight.
The catalyst is prepared by steps of:
(1) Weighing the hydrothermally modified bauxite, alumina and magnesium oxide according to the above-mentioned parts by weight, fully kneading with cobalt oxalate, molybdenum trioxide and tungsten trioxide to obtain a mixture;
(2) Extruding the mixture to obtain an extruded product;
(3) Drying and calcining the extruded product to obtain the catalyst; wherein, the drying is carried out at a temperature of 120° C. for a period of 6 hours; the calcining is carried out at a temperature of 600° C. for a period of 5 hours.

Experimental Example

In order to prove the technical effects of the catalyst carrier with shift and adsorption purification performance of the present invention, experimental examples of the present invention were provided to test the catalytic properties of the carrier and the catalyst.

Carriers in Examples 1-4 and Comparative Examples 1-2 were sequentially numbered as A-F and subjected to the following test.

Testing Experiments of Carrier Pore Structure

The carrier pore structure of the experimental example was measured on the AutoPoreIV 9500 Automatic Mercury Porosimeter from Micrometrics Company in the United States. The shift relationship between the applied pressure and the volume of intruded mercury was recorded during a pressing process, and the pore structure was analyzed based on Washburn equation:

$$P = \frac{2\gamma \cos \theta}{r}$$

Wherein, P was the measured pore pressure; r was the radius; θ was wetting angle; γ was the surface tension of mercury. The mercury wetting angle θ is 130, the surface tension γ is 0.485 N/m, and the initial test pressure is $3.73 \times 10^{-3}$ MPa and the maximum test pressure is 207 MPa.

The test results of pore structure of the carrier were shown in Table 1.

TABLE 1 the test results of pore structure of the carrier

| Samples | The volume fraction of the macropore having a diameter of 100-300 nm/% |
|---|---|
| A | 18.2 |
| B | 21.6 |
| C | 28.3 |
| D | 9.6 |
| E | 9.3 |
| F | 12.5 |

As can be seen from the data in Table 1, the structure of the catalyst carrier (samples A-D) obtained by the process of the present invention comprised macropore having a diameter of 100-300 nm, and the macropore accounted for 10-30% of the catalyst carrier by volume, which would help to improve the adsorption purification ability on macromolecular particles including oil pollution and dust. In contrast, the carrier (sample E) which was prepared by adding acid treated natural bauxite and the carrier (sample F) which was prepared by using bauxite obtained with a hydrothermal process in the comparative examples, the macropore in its structure having a pore size which was greater than 100 nm accounted for only 9.3%, 12.5% of the catalyst carrier by volume, respectively, and thus had poor adsorption purification ability on macromolecular particles including oil pollution and dust.

The Test Experiment of Carrier Strength

Experimental procedure was described as follows:

According to quartering, 40 g carrier samples A-F were respectively tested on in ZQJ-II intelligent particle strength tester (being directed by national chemical catalyst test center) to obtain line contact crush strength, respectively. An average value represented catalyst strength level.

The test results of Carrier strength were shown in Table 2.

TABLE 2 the test results of Carrier strength

| Samples | Intensity/(N/cm) |
|---|---|
| A | 196 |
| B | 185 |
| C | 176 |
| D | 223 |
| E | 88 |
| F | 106 |

As can be seen from data in Table 2, the carrier (samples A-D) obtained by the preparation process of the present invention has a high strength of 176-223N/cm, and thus could be applied to a hydrogen producing shift reaction of feed gas having high CO concentration, high steam gas ratio and high pressure. In contrast, the carrier (sample E) which was prepared by adding acid treated natural bauxite and the carrier (sample F) which was prepared by using bauxite obtained with a hydrothermal process in the Comparative examples had a low strength of only 88 N/cm and 106 N/cm respectively, a poor anti-hydration performance and could be easily inactivated or pulverized, thus they could not be applied to a hydrogen producing shift reaction of feed gas having high CO concentration, high steam gas ratio and high pressure.

The Test of Anti-Hydration Performance of Carrier

The samples of carrier A-E were ground to 80-160 mesh powder, respectively. 10 g powder of each carrier sample and 50 mL of distilled water were put into a 100 mL-hydrothermal reaction kettle loaded with Teflon, sealed, hydrothermally treated at 200° C. for 4 h. Then the hydrothermally treated samples were dried at 110° C. for 6 h. And the change of crystal phase thereof was detected by using X-ray diffractometer.

The XRD patterns of the above various carriers after the anti-hydration test were shown in FIG. 1. As can be seen, the carriers (samples A-D) of the present invention still maintained a good $MgAl_2O_4$ structure after the hydrothermal treatment, without other new material phase forming, thus showing strong anti-hydration properties. While diffraction peaks of AlOOH and $((Mg_4Al_2)(OH)_{12CO3}(H_2O)_3)_{0.5}$ hydration products as well as $MgAl_2O_4$ spinel phase appeared after hydrothermal treatment for the carrier (Sample E) obtained in the Comparative examples, resulting in weak anti-hydration properties.

Furthermore, carriers in Examples 1-4 and Comparative Examples 1-2 were sequentially numbered as A1-F1 and were subjected to the following tests.

CO Shift Reaction Activity Evaluation Test of the Catalyst

The experimental procedure is as follows:

(1) Catalyst Sulfidation

The sulfidation is divided into three stages: first stage, sulfidation at 250℃ for 360 min; second stage, the temperature was raised to 350℃ and continued sulfuring for 240 min; third stage, sulfidation at 420 ℃ for 180 min;

(2) Activity Tests of the Catalyst:

Evaluation Conditions:

Feed gas composition: 46% of CO, 6% of $CO_2$, the balance being $H_2$;

Catalyst loading volume was 30 ml, pressure was 5 MPa, space velocity was 3000 $h^{-1}$, the volume ratio of water vapor to dry feed gas, ie., steam-gas ratio, was 1.2.

After sulfidation, the activity thereof was tested according to the above evaluation conditions, wherein the reaction temperature was in the range of 250-350° C., the heating rate was 3° C./min, the temperature interval was 50° C., the holding time of each test temperature point was 4 h. CO content before and after reaction was tested using GC-2014 gas chromatograph analyzer, and samples were automatically collected by six-way valve.

The shift activity of the catalyst was represented by CO conversion rate, which was calculated as follows:

$$CO \text{ conversion rate } (\%) = 100\% \times (1-Vo/Vi)/(1+Vo)$$

Wherein, Vi was the volume fraction of CO in the feed gas, Vo was the volume fraction of CO in the conversion of gas.

When the shift reaction temperature was 250° C., 300° C., 350° C., the CO conversion rate of the catalyst was calculated and the results were shown in Table 3.

TABLE 3

CO conversion rate of catalyst under different shift reaction temperatures

| Samples | 250° C. | 300° C. | 350° C. |
|---|---|---|---|
| A1 | 33.5% | 49.5% | 56.9% |
| B1 | 36.4% | 53.3% | 60.3% |
| C1 | 41.3% | 60.4% | 65.3% |
| D1 | 35.1% | 58.6% | 62.4% |
| E1 | 68.7% | 81.3% | 85.2% |
| F1 | 72.0% | 83.4% | 87.7% |

As can be seen from the data in Table 3, the catalyst of the present invention (Samples A1-D1) had moderate CO shift reaction catalytic activity. When they were applied to hydrogen producing shift reaction of feed gas having high CO concentration, high steam gas ratio and high pressure, CO in the feed gas can be converted in a controllable step manner and the temperature of catalyst bed can be controlled within a reasonable range. In contrast, the catalytic activity of the comparative catalysts (sample E1 and the sample F1) was too high and catalyst inactivation easily occur due to high temperature sintering, and even lead to "runaway" phenomenon of the catalyst bed, and thus they cannot be applied to a hydrogen producing shift reaction of feed gas having high CO concentration, high steam gas ratio and high pressure.

Obviously, the above examples are merely illustrations clearly made, and not limited to the embodiments. For those skilled in the art, based on the above description, changes or alterations may be made in other different forms. All embodiments do not need to or cannot be exhaustive hereof. Obvious changes or alterations that is introduced thereof is still within the scope of the invention.

The invention claimed is:

1. A catalyst carrier with shift and adsorption purification performance, comprising the following components:
   modified bauxite, 8-15 parts by weight;
   alumina or pseudo-boehmite, 40-53 parts by weight; and
   magnesium oxide or magnesium hydroxide, 25-32 parts by weight;
   wherein,
   the modified bauxite is prepared by steps of:
      subjecting a natural bauxite to an acid treatment to obtain a treated bauxite, then washing the treated bauxite with distilled water until a waste washing solution is neutral, followed by filtering and drying to obtain the modified bauxite,
      wherein the catalyst carrier comprises macropore in its structure, the macropore having a diameter of 100-300 nm and accounting for 18.2%-28.3% of the catalyst carrier by volume, and
      wherein the acid treatment is carried out at a temperature of 30-70° C. for a period of 2-8 hours.

2. The catalyst carrier of claim 1, wherein,
   the acid is selected from the group consisting of nitric acid, phosphoric acid, oxalic acid, boric acid or mixtures thereof; and
   the acid has a concentration of 1-3 mol/L.

3. The catalyst carrier of claim 1, wherein, the drying is carried out at a temperature of 120-150° C. for a period of 4-6 hours.

4. The catalyst carrier of claim 1, wherein, the modified bauxite has a particle size of 100-150 mesh, a specific surface area of 120-180 $m^2/g$, and a pore volume of 0.15-0.40 ml/g.

5. A catalyst based on the catalyst carrier of claim 1, wherein, the catalyst carrier is loaded with an active ingredient comprising
   CoO and/or NiO in 2-5 parts by weight, and
   $MoO_3$ and/or $WO_3$ in 6-10 parts by weight.

6. A process for preparing the catalyst of claim 5, comprising the steps of:
   (1) Weighing the modified bauxite, alumina or pseudo-boehmite and magnesium oxide or magnesium hydroxide according to the above-mentioned parts by weight, then fully kneading them with cobalt source and/or nickel source, molybdenum source and/or tungsten source to obtain a mixture;
   (2) Extruding the mixture to obtain an extruded product;
   (3) Drying and calcining the extruded product to obtain a catalyst that has shift and adsorption purification performance.

7. The process of claim 6, wherein,
   the cobalt source is cobalt oxalate,
   the nickel source is nickel oxalate;
   the molybdenum source is molybdenum trioxide and/or molybdenum concentrate, and the tungsten source is tungsten trioxide.

8. The process of claim 7, wherein, in step (3),
   the drying is carried out at a temperature of 110-140° C. for a period of 4-8 hours; and
   the calcining is carried out at a temperature of 580-680° C. for a period of 4-8 hours.

* * * * *